United States Patent
Akashi

(10) Patent No.: US 9,063,355 B2
(45) Date of Patent: Jun. 23, 2015

(54) OPTICAL MODULATION DEVICE AND CONTROL METHOD IN OPTICAL MODULATION DEVICE

(71) Applicant: Fujitsu Optical Components Limited, Kawasaki-shi (JP)

(72) Inventor: Tamotsu Akashi, Atsugi (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 157 days.

(21) Appl. No.: 13/654,913

(22) Filed: Oct. 18, 2012

(65) Prior Publication Data
US 2013/0156444 A1   Jun. 20, 2013

(30) Foreign Application Priority Data
Dec. 16, 2011  (JP) .................................. 2011-276386

(51) Int. Cl.
*H04B 10/12* (2006.01)
*G02F 1/01* (2006.01)
*H04B 10/50* (2013.01)
*G02F 1/21* (2006.01)

(52) U.S. Cl.
CPC ........ *G02F 1/0123* (2013.01); *H04B 10/50575* (2013.01); *H04B 10/5057* (2013.01); *G02F 2001/212* (2013.01)

(58) Field of Classification Search
CPC ...................... H04B 10/50575; H04B 10/5057
See application file for complete search history.

(56) References Cited

U.S. PATENT DOCUMENTS

| | | | |
|---|---|---|---|
| 5,742,268 A * | 4/1998 | Noda | 345/84 |
| 6,700,907 B2 * | 3/2004 | Schneider et al. | 372/26 |
| 7,006,771 B1 * | 2/2006 | Miyata et al. | 398/198 |
| 7,200,343 B2 * | 4/2007 | Ikeuchi | 398/198 |
| 8,400,702 B2 * | 3/2013 | Tanaka et al. | 359/239 |
| 8,472,810 B2 * | 6/2013 | Akiyama et al. | 398/184 |
| 8,543,010 B2 * | 9/2013 | Zhou et al. | 398/198 |
| 2001/0007508 A1 * | 7/2001 | Ooi et al. | 359/245 |
| 2003/0210915 A1 | 11/2003 | Miyata et al. | |

(Continued)

FOREIGN PATENT DOCUMENTS

| | | |
|---|---|---|
| JP | 2000-241778 | 9/2000 |
| JP | 2001-075062 | 3/2001 |

(Continued)

OTHER PUBLICATIONS

Japanese Office Action mailed Apr. 21, 2015 in corresponding Japanese Patent Application No. 2011-276386.

*Primary Examiner* — Ken Vanderpuye
*Assistant Examiner* — Jai Lee
(74) *Attorney, Agent, or Firm* — Staas & Halsey LLP

(57) ABSTRACT

In an optical modulation device, a driver applies a drive signal based on a data signal to a modulation unit, the modulation unit modulates the light input from an LD by the drive signal, and a bias control unit calculates a bias voltage value so as to make the f0 element closer to "0," according to a detection result in a synchronization detection unit, and supplies a bias voltage of the calculated voltage value to the modulation unit. The bias control unit stops ABC control when the data signal is in a state different from a predefined state during the ABC control, and, after the stop of the ABC control, restarts the ABC control using, as an initial value, a bias voltage value calculated before the stop of the ABC control.

8 Claims, 7 Drawing Sheets

(56) References Cited

U.S. PATENT DOCUMENTS

2004/0013428 A1 1/2004 Nakajima et al.
2008/0080872 A1* 4/2008 Tanaka et al. .............. 398/186
2008/0095543 A1 4/2008 Miyata et al.
2009/0297168 A1 12/2009 Miyata et al.
2011/0211830 A1 9/2011 Miyata et al.

FOREIGN PATENT DOCUMENTS

| | | |
|---|---|---|
| JP | 2001-350128 | 12/2001 |
| JP | 2004-056187 | 2/2004 |
| JP | 2008-92172 | 4/2008 |
| JP | 2011-232553 | 11/2011 |

* cited by examiner

OPTICAL MODULATION DEVICE AND CONTROL METHOD IN OPTICAL MODULATION DEVICE

CROSS-REFERENCE TO RELATED APPLICATION

This application is based upon and claims the benefit of priority of the prior Japanese Patent Application No. 2011-276386, filed on Dec. 16, 2011, the entire contents of which are incorporated herein by reference.

FIELD

The embodiments discussed herein are directed to an optical modulation device and a control method in the optical modulation device.

BACKGROUND

In the related art, an LN modulator is used in an optical modulation device that realizes a high-speed optical transmission system. The LN modulator modulates the light input from a luminous element such as an LD (Laser Diode) to output an optical signal.

Also, it is known that a modulation curve of the LN modulator is formed with a cos-squared function curve in a case where the vertical axis of a two-dimensional coordinate axis indicates the optical signal intensity (i.e. optical intensity) and the horizontal axis indicates a bias voltage. In an LN modulator adopting a CS-RZ (Carrier Suppression-Return to Zero) modulation scheme, an optical duobinary modulation scheme, a DPSK (Differential Phase Shift Keying) modulation scheme or a DQPSK (Differential Quadrature Phase-Shift Keying) modulation scheme, a bias voltage having an amplitude of 2 Vπ is used. Here, Vπ represents a voltage capable of changing a phase of the light input from the LN modulator by π.

In the LN modulator, as illustrated in FIG. 1, a DC drift occurs in which the modulation curve moves in the horizontal axis direction over time. Accordingly, an optimum value of the bias voltage changes over time. Therefore, in the LN modulator, ABC control (i.e. Auto Bias Control) as feedback control is performed to sequentially control the bias voltage to the optimum value.

In the ABC control, a pilot signal of a frequency of f0 is superimposed over the bias voltage. When the bias voltage has the optimum value, an optical signal output from the LN modulator does not have an f0 element, and, when the bias voltage shifts from the optimum value, an optical signal output from the LN modulator has the f0 element. Therefore, in the ABC control, the bias voltage is controlled such that this f0 element is minimum.

A related-art example is described, for example, in Japanese Laid-open Patent Publication No. 2008-092172

A drive signal applied to an LN modulator is generated by amplifying a data signal input in the LN modulator, and therefore an optical signal turned "ON" or "OFF" is output according to "0" and "1" of the data signal in the LN modulator. That is, in the LN modulator, ABC control is performed using the data signal input in the LN modulator.

Therefore, when an abnormality occurs in the data signal, the ABC control becomes unstable and therefore the bias voltage becomes indeterminate. As illustrated in FIG. 1, the modulation curve of the LN modulator is the cos-squared function curve in which the top turning point and the bottom turning point periodically repeat, and therefore there are a plurality of optimum values of the bias voltage. In the example of FIG. 1, there are three optimum values $V_1$, $V_2$ and $V_3$. Therefore, if the ABC control continues in an unstable state while the data signal is in an abnormal state, the bias voltage may converge to the optimum value $V_3$ due to an influence such as noise including the f0 element. Meanwhile, because of limitations of a circuit to supply a bias voltage to the LN modulator, there is an upper limit value of the bias voltage. In the example of FIG. 1, the upper limit value of the bias voltage is illustrated as $V_{max}$.

Thus, since there is the upper limit value of the bias voltage, if the bias voltage converges to the optimum value near the upper limit value and a DC drift occurs, the bias voltage may exceed the upper limit value. In the example of FIG. 1, the optimum value $V_3$ exceeds the upper limit value $V_{max}$ due to the DC drift.

If the bias voltage exceeds the upper limit value, it is not possible to supply an optimum bias voltage to the LN modulator, and therefore it is not possible to perform suitable modulation processing on a signal in the LN modulator.

SUMMARY

According to an aspect of an embodiment of the invention, an optical modulation device includes a modulation unit that modulates an input light by a drive signal to output an optical signal, a drive unit that applies the drive signal based on a data signal to the modulation unit, and a first bias control unit that performs a bias control to adjust an operating point of a bias voltage of the drive signal such that an optical intensity in a modulation curve of the modulation unit decreases according to a bias voltage value sequentially calculated by the first bias control unit, stops the bias control when the data signal is in a different state different from a predefined state during the bias control and, after the stop of the bias control, restarts the bias control using, as an initial value, a bias voltage value calculated by the first bias control unit before the stop of the bias control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
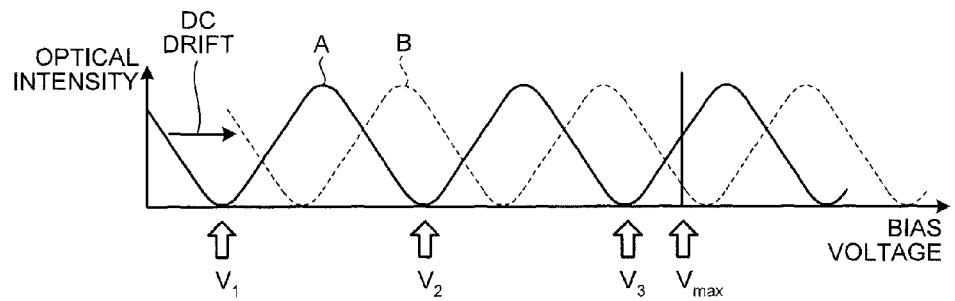
FIG. 1 is a diagram provided for illustrating a DC drift.

Preferred embodiments of the present invention will be explained with reference to accompanying drawings. Here, the optical modulation device and the control method disclosed in the present application are not limited to these embodiments. Also, the identical reference numerals are assigned to components having the identical function in the embodiments and their explanation will be omitted.

[a] First Embodiment

Configuration of Optical Modulation Device 200

Figure 2:
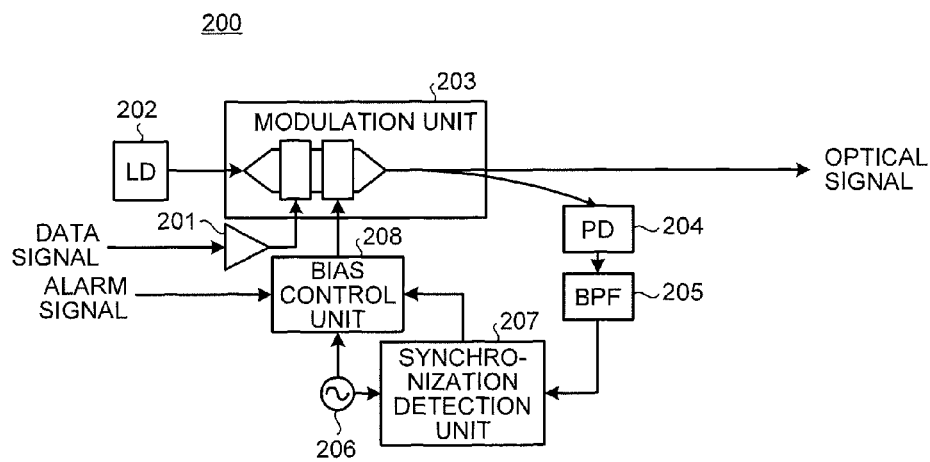
FIG. 2 is a block diagram illustrating a configuration example of an optical modulation device 200 according to a first embodiment.

FIG. 2 is a block diagram illustrating a configuration example of an optical modulation device 200 according to a first embodiment. The optical modulation device 200 includes a driver (i.e. drive circuit) 201, an LD 202, a modulation unit 203, a PD (PhotoDiode) 204, a BPF (Band Pass Filter) 205, an oscillator 206, a synchronization detection unit 207 and a bias control unit 208.

The light generated by the LD 202 is input in the modulation unit 203.

The driver 201 amplifies an input data signal and applies a drive signal based on the data signal to the modulation unit 203 to drive the modulation unit 203.

The modulation unit 203 modulates the light input from the LD 202 by the drive signal applied from the driver 201. Also, bias control of the modulation processing in the modulation unit 203 is performed according to a bias voltage supplied from the bias control unit 208 to the modulation unit 203. The bias voltage supplied from the bias control unit 208 is superimposed over a pilot signal of frequency f0 input from the oscillator 206 to the bias control unit 208.

The PD 204 receives part of optical signals output from the modulation unit 203 and converts it into an electric signal.

The BPF 205 extracts an element of frequency f0 (i.e. f0 element) from the electric signal input from the PD 204.

The synchronization detection unit 207 performs synchronization detection of the f0 element input from the BPF 205, using the pilot signal of frequency f0 input from the oscillator 206, and outputs the detection result to the bias control unit 208.

The bias control unit 208 calculates a bias voltage value to make the f0 element closer to "0," according to the detection result input from the synchronization detection unit 207, and supplies a bias voltage of the calculated voltage value to the modulation unit 203. This bias voltage is superimposed over the pilot signal of frequency f0 input from the oscillator 206 by the bias control unit 208.

By performing the above series of processing in a sequential manner, the bias control unit 208 performs the following control. That is, in the case of phase modulation, the bias control unit 208 performs ABC control to sequentially adjust an operating point of the bias voltage of a drive signal such that the optical intensity in the modulation curve of the modulation unit 203 decreases, according to sequentially-calculated bias voltage values. More preferably, the bias control unit 208 performs ABC control to sequentially adjust the operating point of the bias voltage of the drive signal to a point at which the optical intensity in the modulation curve of the modulation unit 203 is minimum, according to the sequentially-calculated bias voltage values. Also, in the case of intensity modulation, the bias control unit 208 performs ABC control to sequentially adjust the operating point of a bias voltage of a drive signal to an intermediate point between a point at which the optical intensity in the modulation curve of the modulation unit 203 is minimum and the optical intensity is maximum, according to sequentially-calculated bias voltage values.

Processing in Bias Control Unit 208

The bias control unit 208 stops ABC control when a data signal is in an abnormal state during the ABC control.

Also, the bias control unit 208 restarts the ABC control when the abnormality of the data signal is overcome and the data signal returns to a normal state after the ABC control is stopped. At this time, the bias control unit 208 restarts the ABC control using, as an initial value, a bias voltage value calculated before the ABC control is stopped.

To be more specific, when the data signal is in an abnormal state, an alarm signal indicating this information is input in the bias control unit 208. This alarm signal may be input from either other configurations (not illustrated) in the optical modulation device 200 or other configurations outside the optical modulation device 200. The alarm signal is issued to indicate an abnormal state of the data signal and input in the bias control unit 208 (a) when the data signal continuously input in the driver 201 is stopped, (b) when the amplitude of the data signal is out of a predetermined range, (c) when the frequency of the data signal is out of a predetermined range, or (d) when the data signal includes noise equal to or greater than a threshold. Also, in a case where a data signal is generated by multiplexing multiple data items, the alarm signal is issued to indicate an abnormal state of the data signal and input in the bias control unit 208 (e) when a part of the multiple data items lacks, (f) when the phase difference (i.e. phase shifting) between the multiple data items is equal to or greater than a threshold, (g) when a mark ratio representing a ratio of "0" data and "1" data in the multiple data items is out of a predetermined range, (h) when the amplitude of any of the multiple data items is out of a predetermined range, (i) when the frequency of any of the multiple data items is out of a predetermined range, or (j) when any of the multiple data items includes noise equal to or greater than a threshold. Also, the alarm signal is not issued when the data signal is not in the above states of (a) to (j), that is, when the data signal is in a normal state.

The bias control unit 208 stops a calculation of a bias voltage value and a bias voltage supply to the modulation unit 203, according to the input alarm signal. That is, the bias control unit 208 stops the ABC control when the data signal is in an abnormal state. Also, when stopping the ABC control, the bias control unit 208 fixes the bias voltage value to a voltage value at the time of the stop of the ABC control, that is, a voltage value calculated immediately before the ABC control is stopped. Also, the bias control unit 208 supplies a bias voltage of the fixed voltage value to the modulation unit 203 during the stop of the ABC control. Thus, the bias voltage of the fixed value is supplied to the modulation unit 203 during the stop of the ABC control, while the data signal is in an abnormal state, and therefore a noise is output from the modulation unit 203.

Subsequently, when the data signal returns to a normal state and the alarm signal is not input after the stop of the ABC control, the bias control unit 208 restarts the ABC control using, as an initial value, the bias voltage value fixed at the time of the stop of the ABC control.

Therefore, for example, when the bias voltage value is near $V_1$ in FIG. 1 at the timing an abnormality occurs in the data signal, the bias voltage value is fixed near $V_1$ during the stop of the ABC control. Subsequently, when the data signal returns to a normal state and the ABC control is restarted, the ABC control is restarted using the fixed bias voltage value near $V_1$ as an initial value, and therefore the ABC control is performed again such that the bias voltage value converges to $V_1$. Therefore, even in a case where an abnormality occurs in the data signal, it is possible to prevent a convergent point of the bias voltage value to be changed from $V_1$ to $V_2$ or $V_3$.

As described above, according to the first embodiment, in the optical modulation device 200, the bias control unit 208 stops ABC control and fixes a bias voltage value when a data signal is in an abnormal state, while restarting the ABC control using the fixed bias voltage value as an initial value when the data signal returns to a normal state, thereby stabilizing the ABC control.

Accordingly, it is possible to prevent the ABC control from being unstable due to an abnormality of the data signal and the bias voltage from being indeterminate, and therefore it is possible to prevent the bias voltage from converging to an optimum value closer to an upper limit value. Therefore, it is possible to prevent the bias voltage from exceeding the upper limit value due to an influence of a DC drift. As a result, even if the DC drift occurs, it is possible to continue a supply of an optimum bias voltage to the modulation unit 203 without stopping it and reliably continue the modulation processing in the modulation unit 203.

Also, by fixing a bias voltage value at the timing an abnormality occurs in a data signal, it is possible to fix the bias voltage value before the ABC control becomes unstable. Therefore, when an abnormality of the data signal is overcome, since it is possible to restart the ABC control using, as an initial value, the bias voltage value before being unstable, it is possible to make the bias voltage converge to an optimum value quickly after the ABC control is restarted.

[b] Second Embodiment

An optical modulation device according to a second embodiment is similar to the optical modulation device according to the first embodiment in stopping ABC control when a data signal is in an abnormal state during the ABC control and restarting the ABC control using, as an initial value, a bias voltage value calculated before the stop of the ABC control when the data signal returns to a normal state after the stop of the ABC control. Meanwhile, the optical modulation device according to the second embodiment differs from the optical modulation device according to the first embodiment in storing sequentially-calculated bias voltage values in a memory and, when a data signal returns to a normal state after the stop of ABC control, restarting the ABC control using, as an initial value, a bias voltage value stored immediately before the data signal gets in an abnormal state.

Configuration of Optical Modulation Device 300

Figure 3:
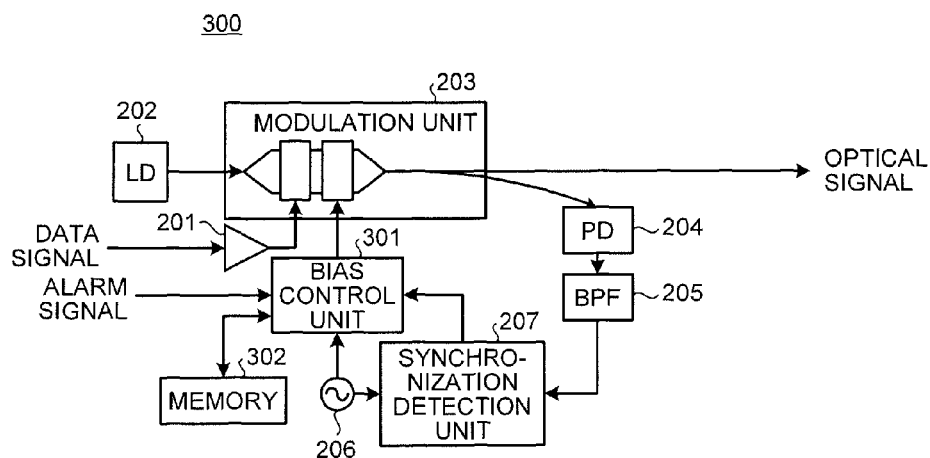
FIG. 3 is a block diagram illustrating a configuration example of an optical modulation device 300 according to a second embodiment.

FIG. 3 is a block diagram illustrating a configuration example of the optical modulation device 300 according to the second embodiment. In FIG. 3, the optical modulation device 300 includes a bias control unit 301 and a memory 302.

Processing in Bias Control Unit 301

The bias control unit 301 writes and stores sequentially-calculated bias voltage values in the memory 302 when a data signal is in a normal state. At this time, the bias control unit 301 may store the sequentially-calculated bias voltage values in the memory 302 in order or update the memory 302 by the latest bias voltage value. That is, the memory 302 can store the latest bias voltage value at the time the data signal is in a normal state.

The bias control unit 301 stops ABC control according to an alarm signal input at the time the data signal is in an abnormal state, and stops a bias voltage value to be stored in the memory 302.

Subsequently, when the data signal returns to a normal state and the alarm signal is not input after the stop of the ABC control, the bias control unit 301 reads the latest bias voltage value stored in the memory 302, that is, a bias voltage value calculated immediately before the data signal gets in an abnormal state, from the memory 302, and restarts the ABC control using the read voltage value as an initial value. Also, the bias control unit 301 restarts a bias voltage value to be stored in the memory 302 when the alarm signal is not input.

Bias Control Processing Steps in Bias Control Unit 301

Figure 4:
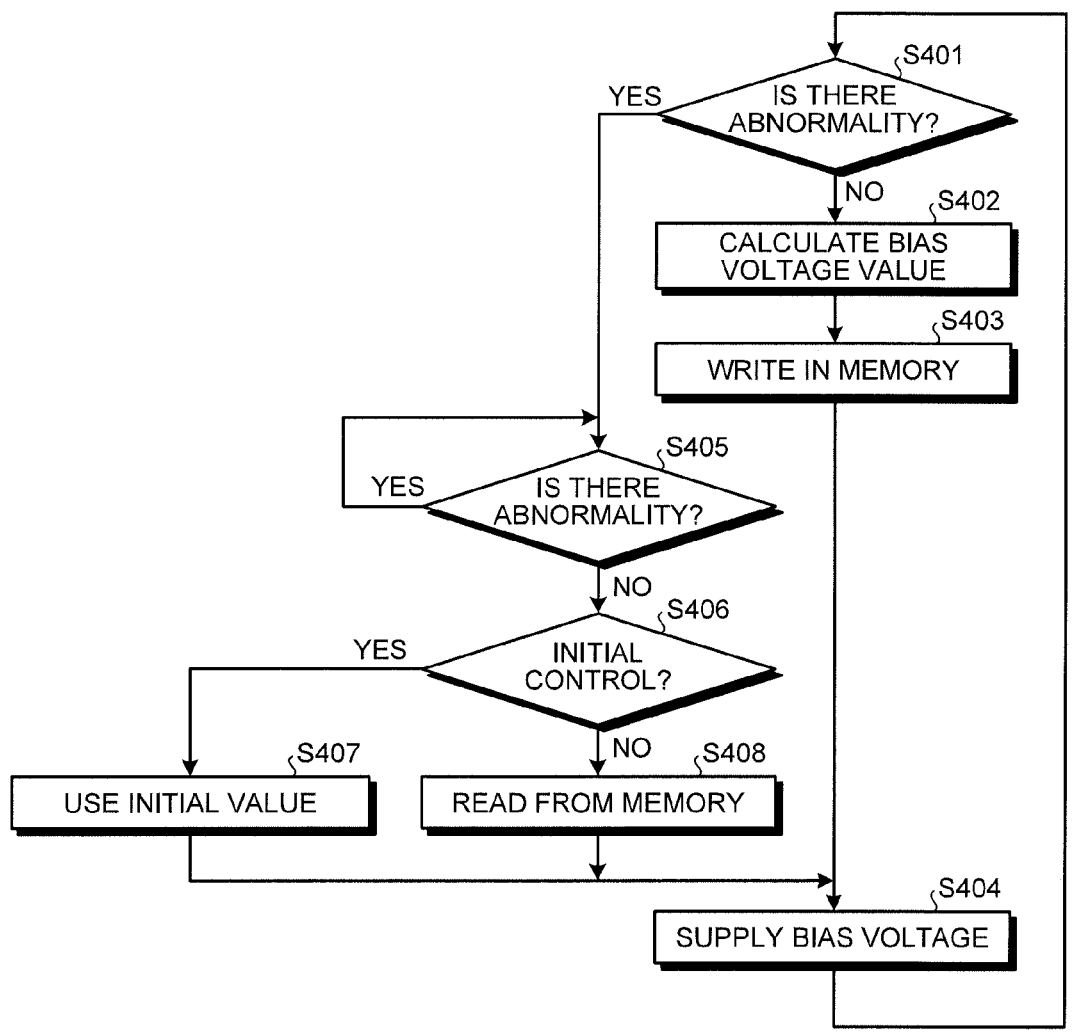
FIG. 4 is a flowchart provided for illustrating bias control in the second embodiment.

FIG. 4 is a flowchart provided for illustrating bias control in the second embodiment.

As illustrated in FIG. 4, when the data signal is in a normal state (step S401: No), the bias control unit 301 calculates a bias voltage value (step S402), writes and stores the calculated voltage value in the memory 302 (step S403) and supplies a bias voltage of the calculated voltage value to the modulation unit 203. While the data signal is in a normal state, the ABC control is performed by repeating the processing in steps S401 to S404.

While an abnormality occurs in the data signal (step S401: Yes) and the data signal is in an abnormal state (step S405: Yes), the ABC control is stopped.

When the abnormality of the data signal is overcome after the stop of the ABC control and the data signal returns to a normal state (step S405: No), the bias control unit 301 decides whether the ABC control is the initial control (step S406).

At the time of the initial control in the ABC control (step S406: Yes), the bias control unit 301 supplies a bias voltage of a predetermined initial value to the modulation unit 203 (steps S407 and S404). Accordingly, the ABC control is started.

At the time of second or subsequent control in the ABC control (step S406: No), the bias control unit 301 supplies a bias voltage of the voltage value read from the memory 302, to the modulation unit 203 (steps S408 and S404). Accordingly, the stopped ABC control is restarted.

As described above, according to the second embodiment, in the optical modulation device 300, the bias control unit 301 stops ABC control when a data signal is in an abnormal state, while, when the data signal returns to a normal state, restarting the ABC control using, as an initial value, a bias voltage value calculated immediately before the data signal gets in an abnormal state.

Accordingly, it is possible to remove an influence of variation in a bias voltage value within occurrence time of an alarm signal indicating that a data signal is in an abnormal state after the restart of the ABC control. Therefore, compared to the first embodiment, it is possible to make a bias voltage value converge to an optimum value more quickly.

[c] Third Embodiment

An optical modulation device according to a third embodiment differs from the optical modulation device according to the first embodiment in performing amplitude control of a drive signal.

Configuration of Optical Modulation Device 500

Figure 5:
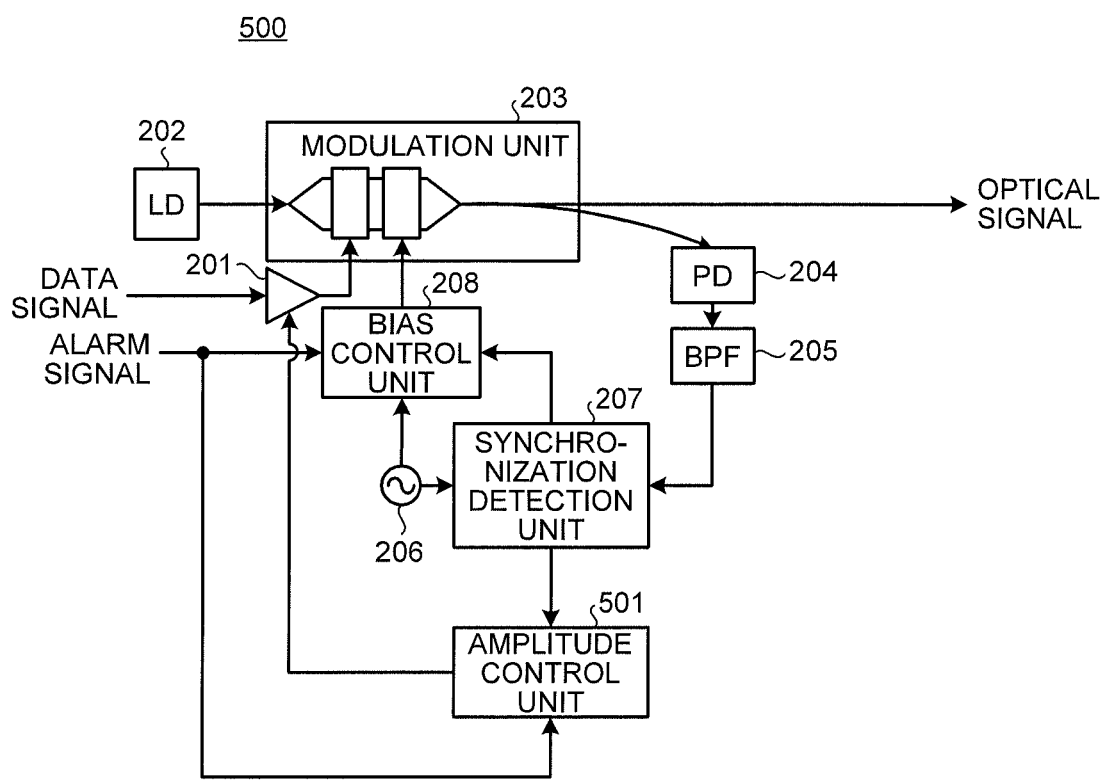
FIG. 5 is a block diagram illustrating a configuration example of an optical modulation device 500 according to a third embodiment.

FIG. 5 is a block diagram illustrating a configuration example of the optical modulation device 500 according to the third embodiment. In FIG. 5, the optical modulation device 500 includes an amplitude control unit 501.

Processing in Amplitude Control Unit 501

The amplitude control unit 501 accepts an input of a detection result from the synchronization detection unit 207. The amplitude control unit 501 calculates an amplitude value so as to make the f0 element closer to "0," according to the detection result input from the synchronization detection unit 207, and controls the amplitude of a drive signal by changing an amplification factor of the driver 201 according to the calculated amplitude value. The amplitude control unit 501 performs amplitude control to sequentially change the amplitude of the drive signal according to amplitude values sequentially calculated in this way.

The amplitude control unit 501 stops the amplitude control when a data signal is in an abnormal state during the amplitude control.

Also, the amplitude control unit 501 restarts the amplitude control when an abnormality of the data signal is overcome after the stop of the amplitude control and the data signal returns to a normal state. At this time, the amplitude control unit 501 restarts the amplitude control using, as an initial value, an amplitude value calculated before the stop of the amplitude control.

To be more specific, when the data signal is in an abnormal state, an alarm signal indicating this information is input in the amplitude control unit 501. Also, the alarm signal is not input in the amplitude control unit 501 when the data signal is in a normal state.

The amplitude control unit 501 stops the amplitude control according to the input alarm signal. That is, the amplitude control unit 501 stops the amplitude control when the data signal is in an abnormal state. Also, when stopping the amplitude control, the amplitude control unit 501 fixes an amplitude value to an amplitude value at the time of the stop of the amplitude control, that is, an amplitude value calculated immediately before the stop of the amplitude control.

Subsequently, when the data signal returns to a normal state and an alarm signal is not input after the stop of the amplitude control, the amplitude control unit 501 restarts the amplitude control using, as an initial value, the amplitude value fixed at the time of the stop of the amplitude control.

Here, similar to the bias control unit 301 in the second embodiment, the amplitude control unit 501 may store sequentially-calculated amplitude values in a memory, and, when the data signal returns to a normal state after the stop of the amplitude control, restart the amplitude control using, as an initial value, an amplitude value stored immediately before the data signal gets in an abnormal state.

As described above, according to the third embodiment, in the optical modulation device 500, the amplitude control unit 501 stops amplitude control when a data signal is in an abnormal state, while, when the data signal returns to a normal state, restarting the amplitude control using, as an initial value, an amplitude value calculated before the stop of the amplitude control.

Accordingly, it is possible to prevent the amplitude value of a drive signal from being unstable due to an abnormality of the data signal.

Also, when the abnormality of the data signal is overcome, it is possible to restart the amplitude control using, as an initial value, an amplitude value before being unstable, and therefore it is possible to make the amplitude of the drive signal converge to an optimum value quickly after the restart of the amplitude control.

[d] Fourth Embodiment

An optical modulation device according to a fourth embodiment differs from the optical modulation device according to the first embodiment in performing modulation processing in a QPSK (Quadrature Phase Shift Keying) modulation scheme.

Configuration of Optical Modulation Device 600

Figure 6:
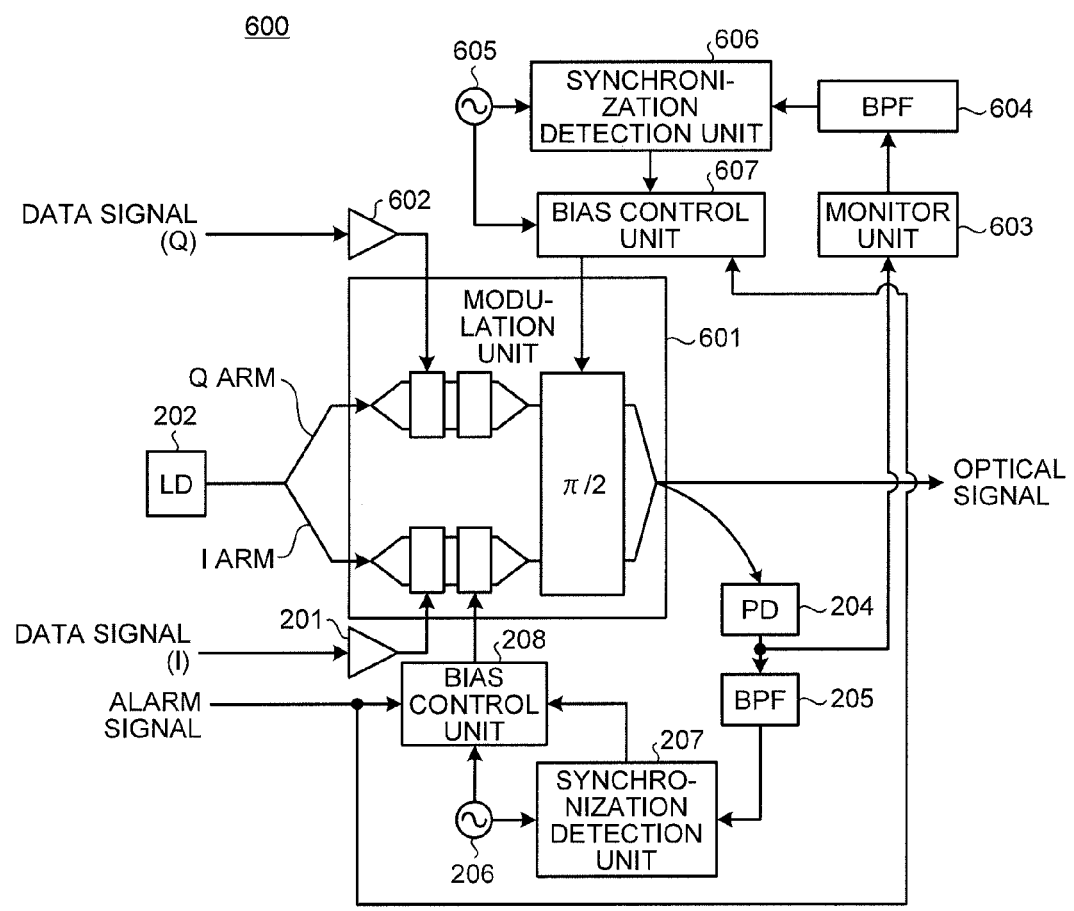
FIG. 6 is a block diagram illustrating a configuration example of an optical modulation device 600 according to a fourth embodiment.

FIG. 6 is a block diagram illustrating a configuration example of the optical modulation device 600 according to the fourth embodiment. In FIG. 6, the optical modulation device 600 includes a modulation unit 601, a driver 602 (i.e. drive circuit), a monitor unit 603, a BPF 604, an oscillator 605, a synchronization detection unit 606 and a bias control unit 607.

The driver 201 amplifies an input data signal (I) and applies a drive signal based on the data signal (I) to the I arm of the modulation unit 601 to drive the I arm of the modulation unit 601.

The driver 602 amplifies an input data signal (Q) and applies a drive signal based on the data signal (Q) to the Q arm of the modulation unit 601 to drive the Q arm of the modulation unit 601.

The modulation unit 601 has two arms of the I arm and the Q arm and performs modulation processing in the QPSK modulation scheme. The modulation unit 601 modulates the light input from the LD 202 by the drive signal applied from the driver 201 in the I arm and modulates the light by the drive signal applied from the driver 602 in the Q arm. Also, bias control of the modulation processing in the modulation unit 601 is performed according to a bias voltage supplied from the bias control unit 208 to the modulation unit 601. An optical signal (I) is output from the I arm and an optical signal (Q) is output from the Q arm. Also, in the modulation unit 601, the bias control unit 607 performs bias control (i.e. $\pi/2$ bias control) such that the phase difference between the optical signal (I) and the optical signal (Q) is $\pi/2$ (i.e. $\pi/2$ shift). Therefore, from the modulation unit 601, an optical signal having the I element and the Q element is output.

The ABC control processing on the I arm side in FIG. 6 is as explained in the first embodiment. Also, the same processing as the ABC control processing explained in the first embodiment is also performed on the Q arm side.

The monitor unit 603 accepts an input of an electric signal from the PD 204. The monitor unit 603 detects the electric power of the optical signal input from the PD 204.

The BPF 604 extracts the f0 element of the electric power input from the monitor unit 603.

The synchronization detection unit 606 performs synchronization detection of the f0 element input from the BPF 604, using the pilot signal of frequency f0 input from the oscillator 605, and outputs the detection result to the bias control unit 607.

The bias control unit 607 calculates a bias voltage value so as to make the f0 element close to "0," according to the detection result input from the synchronization detection unit 606, and supplies a bias voltage of the calculated voltage value to the modulation unit 601. This bias voltage is superimposed over the pilot signal of frequency f0 input from the oscillator 605 by the bias control unit 607.

By sequentially performing the above series of processing, the bias control unit 607 performs $\pi/2$-shift ABC control according to sequentially-calculated bias voltage values.

Processing in Bias Control Unit 607

The bias control unit 607 stops ABC control when a data signal is in an abnormal state during the ABC control.

Also, when an abnormality of the data signal is overcome after the stop of the ABC control and the data signal returns to a normal state, the bias control unit 607 restarts the ABC control. At this time, the bias control unit 607 restarts the ABC control using, as an initial value, a bias voltage value calculated before the stop of the ABC control.

To be more specific, when the data signal is in an abnormal state, an alarm signal indicating this information is input in the bias control unit 607. Also, the alarm signal is not input in the bias control unit 607 when the data signal is in a normal state.

The bias control unit 607 stops a calculation of a bias voltage value and a supply of the bias voltage to the modulation unit 601, according to the input alarm signal. That is, the bias control unit 607 stops the ABC control when the data signal is in an abnormal state. Also, when stopping the ABC control, the bias control unit 607 fixes the bias voltage value to a voltage value at the time of the stop of the ABC control, that is, a voltage value calculated immediately before the ABC control is stopped.

Subsequently, when the data signal returns to a normal state and the alarm signal is not input after the stop of the ABC control, the bias control unit 607 restarts the ABC control using, as an initial value, the bias voltage value fixed at the time of the stop of the ABC control.

Also, similar to the bias control unit 301 in the second embodiment, the bias control unit 607 may store sequentially-calculated bias voltage values in a memory and, when the data signal returns to a normal state after the stop of the ABC control, restart the ABC control using, as an initial value, a bias voltage value stored immediately before the data signal gets in an abnormal state.

As described above, according to the fourth embodiment, in the optical modulation device 600, the bias control unit 607 stops ABC control when a data signal is in an abnormal state, while, when the data signal returns to a normal state, restarting the ABC control using, as an initial value, a bias voltage value calculated before the stop of the ABC control.

Accordingly, it is possible to prevent the ABC control from being unstable due to an abnormality of the data signal and the bias voltage from being indeterminate.

Also, when the abnormality of the data signal is overcome, it is possible to restart the ABC control using, as an initial value, a bias voltage value before being indeterminate, and therefore it is possible to make the bias voltage converge to an optimum value quickly after the restart of the ABC control.

[e] Fifth Embodiment

An optical modulation device according to a fifth embodiment differs from the optical modulation device according to the first embodiment in including a multiplexed data generation unit that multiplexes multiple data items to generate a data signal.

Configuration of Optical Modulation Device 700

Figure 7:
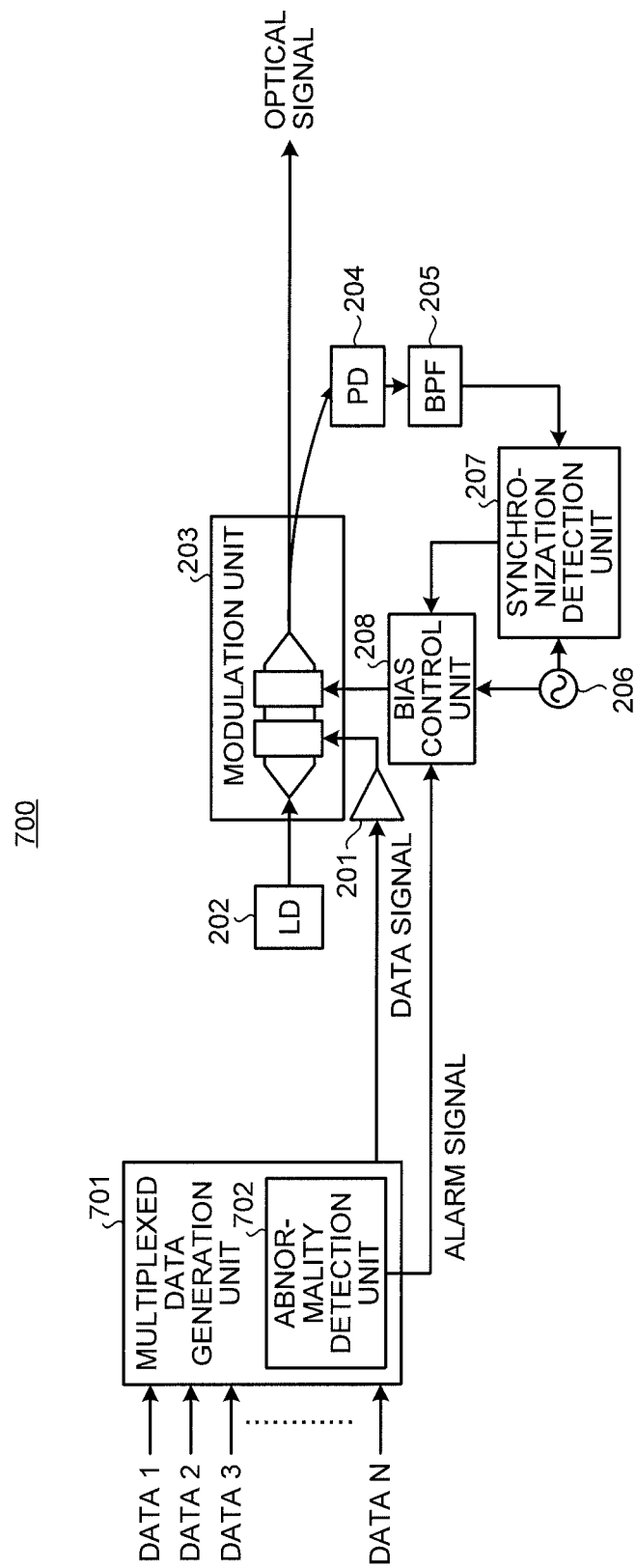
FIG. 7 is a block diagram illustrating a configuration example of an optical modulation device 700 according to a fifth embodiment.

FIG. 7 is a block diagram illustrating a configuration example of the optical modulation device 700 according to the fifth embodiment. In FIG. 7, the optical modulation device 700 includes a multiplexed data generation unit 701. Also, the multiplexed data generation unit 701 includes an abnormality detection unit 702.

The multiplexed data generation unit 701 multiplexes multiple data items 1 to N to generate a data signal multiplexing the multiple data items and outputs the generated data signal to the driver 201.

The abnormality detection unit 702 detects an abnormality of the data signal and issues an alarm signal when the data signal is in an abnormal state.

Configuration Example of Multiplexed Data Generation Unit 701

Configuration Example 1

Figure 8:
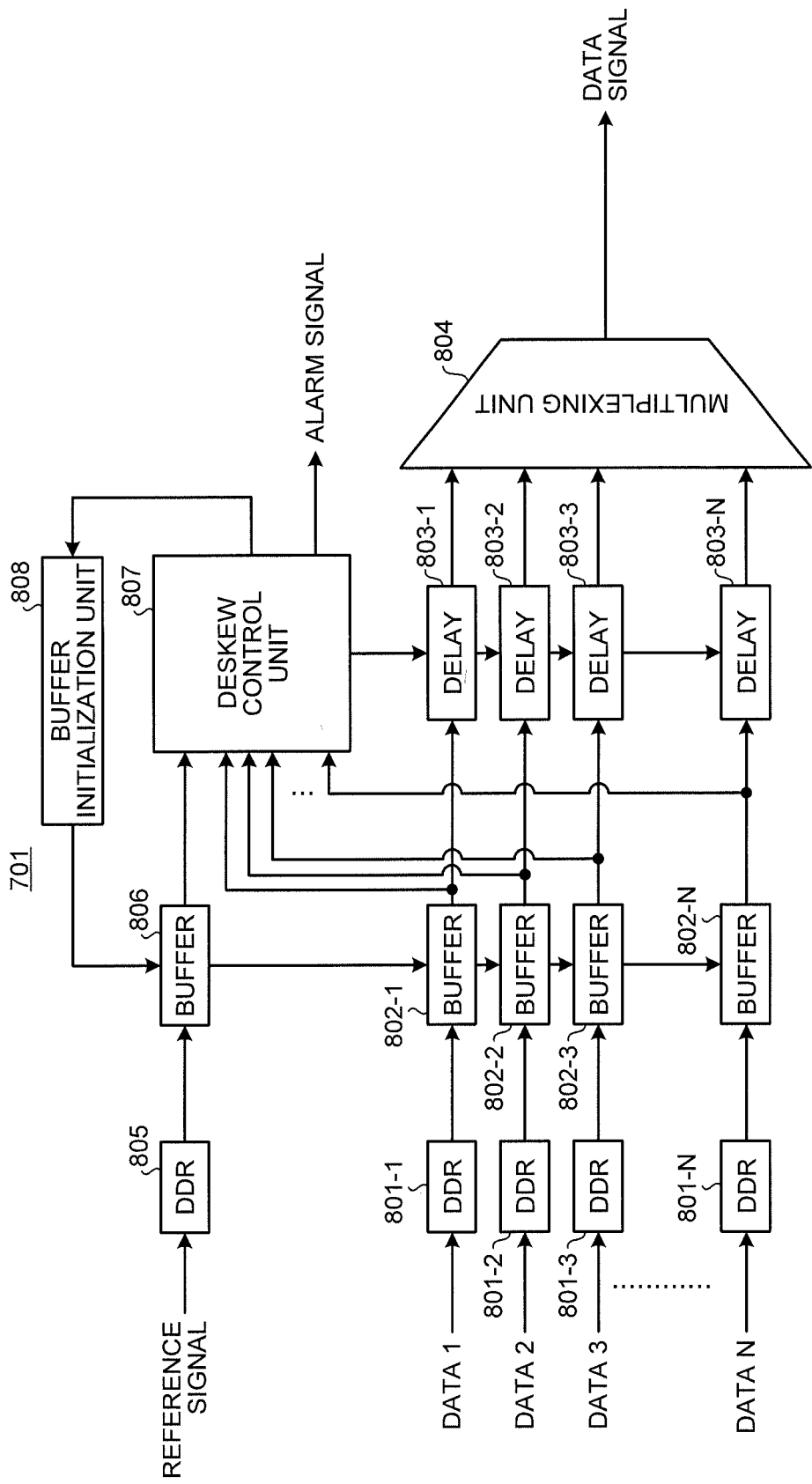
FIG. 8 is a block diagram illustrating a configuration example of a multiplexed data generation unit 701 according to the fifth embodiment (configuration example 1)

FIG. 8 is a block diagram illustrating a configuration example 1 of the multiplexed data generation unit 701 according to the fifth embodiment. The multiplexed data generation unit 701 illustrated in the configuration example 1 includes DDR's 801-1 to 801-N, buffers 802-1 to 802-N, delays 803-1 to 803-N, a multiplexing unit 804, a DDR 805, a buffer 806, a deskew control unit 807 and a buffer initialization unit 808. The configuration example 1 is based on "Serdes Framer Interface Level 5 (SFI-5): Implementation Agreement for 40 Gb/s Interface for Physical Layer Devices., OIF-SFI5-01.02, Jan. 29, 2002" (hereinafter referred to as "SFI-5").

The DDR's 801-1 to 801-N perform waveform shaping of the data 1 to N.

The buffers 802-1 to 802-N are FIFO system buffers and temporarily accumulate the data sequentially input from the DDR's 801-1 to 801-N and output the accumulated data to the delays 803-1 to 803-N and the deskew control unit 807 in order.

The delays 803-1 to 803-N delay the data 1 to N according to control by the deskew control unit 807 and outputs the results to the multiplexing unit 804.

The multiplexing unit 804 multiplexes the data 1 to N and generates a data signal.

The DDR 805 performs waveform shaping of a reference signal.

The buffer 806 is an FIFO system buffer and temporarily accumulates reference signals sequentially input from the DDR 805 and outputs the accumulated reference signals to the deskew control unit 807 in order.

The deskew control unit 807 adjusts phase differences between the data 1 to N by detecting the phase differences between the data 1 to N and controlling a delay amount for the delays 803-1 to 803-N according to the reference signals.

The deskew control unit 807 detects an abnormality of the data signal and, when the data signal is in an abnormal state, issues an alarm signal indicating this information. That is, the deskew control unit 807 corresponds to the abnormality detection unit 702 in FIG. 7. For example, when the data 1 to N is in the above states (5) to (10) described in the first embodiment, the deskew control unit 807 issues an alarm signal to indicate that the data signal is in an abnormal state. According to this alarm signal, the ABC control in the bias control unit 208 (in FIG. 7) is stopped. Also, this alarm signal is input in the buffer initialization unit 808.

When the data signal gets in an abnormal state, that is, when the data signal returns to a normal state again after the stop of the ABC control, the buffer initialization unit 808 detects that the alarm signal is not input from the deskew control unit 807, and clears and initializes the buffers 802-1 to 802-N and 806. Accordingly, data that is the cause of the erroneous data signal is deleted.

Also, it is defined in SFI-5 that data 1 to 16 of 2.4 Gb/s are multiplexed to generate a data signal of 40 Gb/s. Also, it is defined in SFI-5 that signals of the data 1 to 16 are copied every block to generate a reference signal. Further, it is defined in SFI-5 that the phase difference (i.e. phase difference) between the data 1 to 16 is detected by pattern matching, and, when it is not possible to detect a matching pattern in at least one lane, an alarm signal of OOA (Out Of Alignment) is output from the deskew control unit 807.

Configuration Example of Multiplexed Data Generation Unit 701

Configuration Example 2

Figure 9:
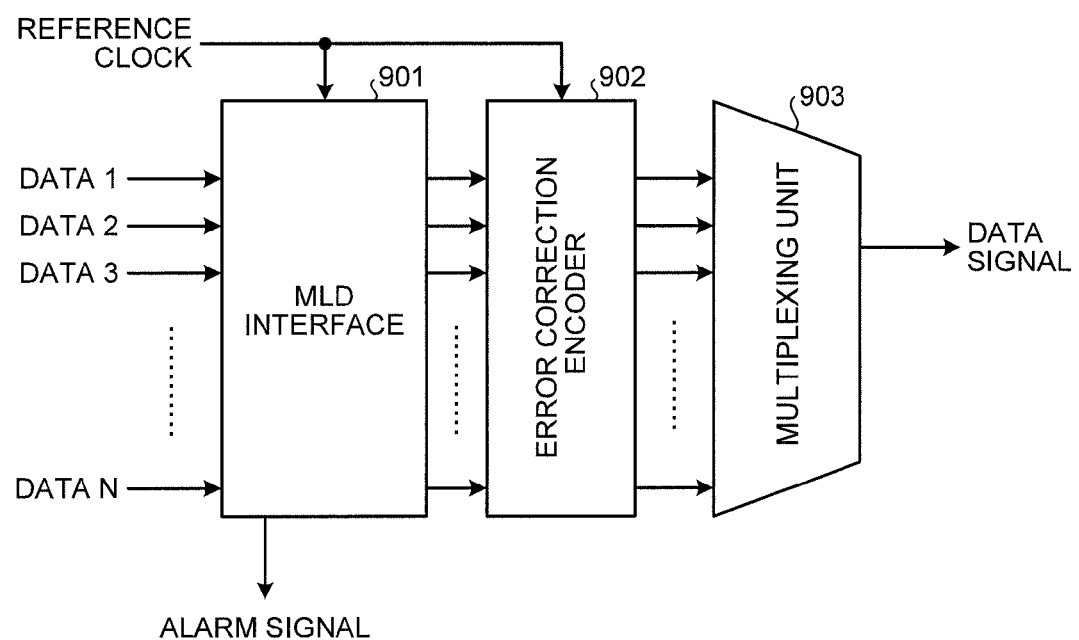
FIG. 9 is a block diagram illustrating a configuration example of the multiplexed data generation unit 701 according to the fifth embodiment (configuration example 2).

FIG. 9 is a block diagram illustrating the configuration example 2 of the multiplexed data generation unit 701 according to the fifth embodiment. The multiplexed data generation unit 701 illustrated in the configuration example 2 includes an MLD (Multi Lane Distribution) interface 901, an error correction encoder 902 and a multiplexing unit 903. The configuration example 2 is applicable to a transmission unit in "Multisource Agreement for 100G Long-Haul DWDM Transmission Module-Electromechanical, IA #OIF-MSA-100GLH-EM-01.0, Jun. 8, 2010" (hereinafter referred to as "MSA-100GLH").

The MLD interface 901 receives MLD signals transmitted in parallel and used in the 100 Gb/s Ethernet (registered trademark). The MLD interface 901 detects an abnormality of a data signal and, when the data signal is in an abnormal state, issues an alarm signal indicating this information. That is, the MLD interface 901 corresponds to the abnormality detection unit 702 in FIG. 7. The MLD interface 901 accepts an input of data 1 to N and, when the data 1 to N is in the above states (5) to (10) described in the first embodiment, issues an alarm signal (i.e. MLD alarm) to indicate that the data signal is in an abnormal state. According to this alarm signal, the ABC control in the bias control unit 208 (in FIG. 7) is stopped.

The error correction encoder 902 performs error correction coding on the data 1 to N.

When the data signal is in a normal state, by using a clock extracted from the data 1 to N as a clock to operate the MLD interface 901 and the error correction encoder 902, it is possible to support variation in the data. Meanwhile, when the data signal is in an abnormal state, a reference clock input from the outside is temporarily used, and, when the data signal returns to a normal state again, the clock extracted from the data 1 to N is used again. Thus, by temporarily using the reference clock input from the outside, it is possible to restore a normal operation quickly. Also, when the data signal returns to a normal state again, the multiplexing unit 903 may be initialized to remove a data abnormality.

The multiplexing unit 903 multiplexes the data 1 to N to generate a data signal.

Also, it is defined in MAS-100GLH that data 1 to 10 of 11.2 Gb/s are multiplexed to generate a data signal of 100 Gb/s.

As described above, according to the fifth embodiment, in the optical modulation device 700, when a data signal returns to a normal state after the stop of ABC control, the multiplexed data generation unit 701 is initialized.

Accordingly, it is possible to reliably restore a data signal from an abnormal state to a normal state.

Embodiments of the present invention have been described above.

Also, it is possible to combine the fifth embodiment and the second to fourth embodiments.

Also, the amplitude control based on a data signal abnormality described in the third embodiment and the bias control based on a data signal abnormality described in the fourth embodiment can be individually performed without being combined with the bias control based on a data signal abnormality described in the first embodiment.

Also, it is described in the above explanation that a data signal has two states of "normal state" and "abnormal state." However, the two states are not limited to the "normal state" and "abnormal state." The data signal can have at least two states of "predefined state" and "state different from the predefined state."

According to the above aspects of the optical modulation device and the control method disclosed in the present application, it is possible to stabilize the ABC control.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulation device comprising:
    a modulation unit that modulates an input light by a drive signal to output an optical signal;
    a drive unit that applies the drive signal based on a data signal to the modulation unit; and
    a first bias control unit that performs a bias control to adjust an operating point of a bias voltage of the drive signal such that an optical intensity in a modulation curve of the modulation unit decreases according to a bias voltage value sequentially calculated by the first bias control unit, stops the bias control when the data signal is in a second state different from a first state during the bias control, fixes the bias voltage value to a voltage value at the time of stopping the bias control, continues to supply the bias voltage having the fixed voltage value to the modulation unit during stopping the bias control, and restarts the bias control using the fixed voltage value as an initial value when the data signal returns to the first state from the second state.

2. The optical modulation device according to claim 1, wherein
    the first bias control unit performs the bias control to adjust the operating point to a point at which the optical intensity in the modulation curve is minimum.

3. The optical modulation device according to claim 1, wherein
    the first bias control unit performs the bias control to adjust the operating point to an intermediate point between a point at which the optical intensity in the modulation curve is maximum and a point at which the optical intensity in the modulation curve is minimum.

4. The optical modulation device according to claim 1, wherein
    the first bias control unit accepts an input of an alarm signal indicating the different state and stops the bias control according to the alarm signal (a) when the data signal continuously input in the drive unit is stopped, (b) when an amplitude of the data signal is out of a predetermined range, (c) when a frequency of the data signal is out of a predetermined range, (d) when the data signal includes a noise equal to or greater than a threshold, (e) when a part of multiple data items lacks in the data signal generated by multiplexing the multiple data items, (f) a phase difference between the multiple data items is equal to or greater than a threshold, (g) when a mark ratio in the multiple data items is out of a predetermined range, (h) when an amplitude of any of the multiple data items is out of a predetermined range, (i) when a frequency of any of the multiple data items is out of a predetermined range, or (j) when any of the multiple data items includes noise equal to or greater than a threshold.

5. The optical modulation device according to claim 1, further comprising:
 a generation unit that generates the data signal by multiplexing multiple data items; and
 an initialization unit that initializes the generation unit after the stop.

6. The optical modulation device according to claim 1, further comprising an amplitude control unit that performs an amplitude control to sequentially change an amplitude of the drive signal according to an amplitude value sequentially calculated by the amplitude control unit, stops the amplitude control when the data signal is in the different state during the amplitude control and, after the stop of the amplitude control, restarts the amplitude control using, as an initial value, an amplitude value calculated by the amplitude control unit before the stop of the amplitude control.

7. The optical modulation device according to claim 1, wherein
 the modulation unit comprises an I arm that outputs an optical signal of an I element and a Q arm that outputs an optical signal of a Q element, and
 the optical modulation device further comprises a second bias control unit that performs a $\pi/2$ bias control to sequentially control a bias voltage applied to the modulation unit such that a phase difference between the optical signal of the I element and the optical signal of the Q element is $\pi/2$ according to a bias voltage value sequentially calculated by the second bias control unit, stops the $\pi/2$ bias control when the data signal is in the different state during the $\pi/2$ bias control and, after the stop of the $\pi/2$ bias control, restarts the $\pi/2$ bias control using, as an initial value, a bias voltage value calculated by the second bias control unit before the stop of the $\pi/2$ bias control.

8. A control method for an optical modulation device, the method comprising:
 performing a bias control by a bias control unit to adjust an operating point of a bias voltage of a drive signal based on a data signal such that an optical intensity in a modulation curve of a modulation unit decreases according to a bias voltage value sequentially calculated, the modulation unit modulating an input light by the drive signal to output an optical signal, the drive signal being applied to the modulation unit;
 stopping the bias control when the data signal is in a second state different from a first state during the bias control;
 fixing the bias voltage value to a voltage value at the time of stopping the bias control;
 continuing to supply the bias voltage having the fixed voltage value to the modulation unit during stopping the bias control; and
 restarting the bias control using, the fixed voltage value as an initial value when the data signal returns to the first state from the second state.

* * * * *